Patented June 20, 1944

2,351,667

UNITED STATES PATENT OFFICE 2,351,667

PRODUCTION OF SUCCINIC ACIDS

Russell T. Dean, Stamford, and Edwin O. Hook, Darien, Conn., assignors to American Cyanamid Company, New York, N. Y., a corporation of Maine No Drawing. Application August 29, 1942, Serial No. 456,713

5 Claims. (Cl. 260—537)

This invention relates to the preparation of succinic acid and substituted succinic acids.

One method previously utilized for the preparation of succinic acid has involved the reaction of acrylonitrile with hydrocyanic acid to yield succinonitrile which, by hydrolysis, can be converted into succinic acid. This reaction is essentially carried out under anhydrous conditions and is generally undesirable from a commercial standpoint.

We have found that succinic acid and substituted succinic acids may be prepared by reacting sodium cyanide in aqueous solution with suitable sodium acrylates.

More specifically, the following example is illustrative of our process, parts being given by weight.

Example 1

One hundred seventy-eight parts (2 mols) of 81% aqueous acrylic acid was added, slowly and with rapid stirring, to a hot solution (90° C.) of 102 parts (2 mols) of 96% sodium cyanide and 4 parts (1 mol) of sodium hydroxide in 325 parts of water, through a tube reaching below the surface. The mixture acquired a dark brown color, ammonia and hydrogen cyanide being evolved. Ten parts additional sodium cyanide was added near the end of the reaction. When addition was complete, 76 parts (1.9 mol) of sodium hydroxide was added, and the mixture heated three hours on the steam bath. The solution was acidified with 225 parts concentrated sulfuric acid and allowed to stand at room temperature overnight. The product was filtered off and after being recrystallized from water had a melting point of 185–6° C.

In place of the acrylic acid mentioned, various substituted acrylic acids, e. g., methacrylic, ethacrylic and other $\alpha$ substituted acrylic acids, may be used to form the corresponding substituted succinic acids. In place of the sodium cyanide and sodium hydroxide, we may use other water-soluble alkali and alkaline earth metal hydroxides and cyanides.

Suitable variations and changes may be made in carrying out the invention without departing from the spirit and scope thereof as defined in the appended claims.

We claim:

1. In a process of preparing succinic acid, the step which comprises reacting in aqueous solution in the presence of a substantial amount of an alkali, a water-soluble cyanide selected from the group consisting of alkali and alkaline earth metal cyanides with a water-soluble acrylate selected from the group consisting of alkali and alkaline earth metal acrylates.

2. In a process of preparing succinic acid, the step which comprises reacting sodium cyanide with acrylic acid in aqueous solution in the presence of a substantial amount of a water-soluble alkali.

3. The process of preparing succinic acid which comprises reacting sodium cyanide with acrylic acid in aqueous solution in the presence of a substantial amount of a water-soluble alkali, and liberating succinic acid by the addition of sulfuric acid to the reaction product.

4. The process of preparing succinic acid which comprises reacting by heating an aqueous solution containing about 2 mols acrylic acid, about 2 mols alkali metal cyanide and about 1 mol alkali metal hydroxide, and acidifying the reaction solution with sulfuric acid to liberate succinic acid.

5. The process of preparing succinic acid which comprises reacting by heating a strongly alkaline aqueous solution containing about equimolecular amounts of sodium cyanide and a water-soluble acrylate, and acidifying the reaction solution to liberate succinic acid.

RUSSELL T. DEAN.
EDWIN O. HOOK.